United States Patent
Nitta et al.

(10) Patent No.: US 10,361,451 B2
(45) Date of Patent: Jul. 23, 2019

(54) SULFIDE SOLID ELECTROLYTE MATERIAL, LITHIUM SOLID BATTERY, AND PRODUCING METHOD FOR SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Iwao Nitta, Susono (JP); Naotaka Sawada, Susono (JP); Nobuaki Takazawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 213 days.

(21) Appl. No.: 15/409,302

(22) Filed: Jan. 18, 2017

(65) Prior Publication Data
US 2017/0250439 A1    Aug. 31, 2017

(30) Foreign Application Priority Data
Feb. 26, 2016 (JP) .................. 2016-036431

(51) Int. Cl.
| | |
|---|---|
| H01M 10/0525 | (2010.01) |
| H01M 10/0562 | (2010.01) |
| H01M 10/0585 | (2010.01) |
| C01B 17/22 | (2006.01) |
| H01M 10/052 | (2010.01) |

(52) U.S. Cl.
CPC ......... H01M 10/0562 (2013.01); C01B 17/22 (2013.01); H01M 10/0525 (2013.01); H01M 10/0585 (2013.01); C01P 2002/72 (2013.01); H01M 10/052 (2013.01); H01M 2300/0068 (2013.01)

(58) Field of Classification Search
CPC ...... H01M 4/136; H01M 4/58; H01M 10/052; H01M 10/0525; H01M 10/0562; H01M 2300/0068; C01B 17/22; C01P 2002/72
See application file for complete search history.

(56) References Cited

U.S. PATENT DOCUMENTS

| | | | |
|---|---|---|---|
| 2012/0301796 A1 | 11/2012 | Ohtomo et al. | |
| 2013/0164631 A1* | 6/2013 | Ohtomo | H01M 10/0525 429/319 |
| 2015/0200421 A1 | 7/2015 | Homma et al. | |

(Continued)

FOREIGN PATENT DOCUMENTS

| | | |
|---|---|---|
| CN | 105324878 A | 2/2016 |
| JP | H05-306117 A | 11/1993 |

(Continued)

Primary Examiner — Brittany L Raymond
(74) Attorney, Agent, or Firm — Oliff PLC

(57) ABSTRACT

An object of the invention is to provide a sulfide solid electrolyte material with high heat stability. In the invention, the object is achieved by providing a sulfide solid electrolyte material comprising an ion conductor having (i) a Li element and (ii) an anion structure containing at least a P element, wherein a main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

17 Claims, 6 Drawing Sheets

(56) References Cited

U.S. PATENT DOCUMENTS

| | | | | |
|---|---|---|---|---|
| 2015/0207170 A1* | 7/2015 | Aburatani | ............... | H01B 1/10 |
| | | | | 429/306 |
| 2016/0149259 A1 | 5/2016 | Osada et al. | | |
| 2016/0181656 A1* | 6/2016 | Sung | ............... | H01M 10/0562 |
| | | | | 429/305 |

FOREIGN PATENT DOCUMENTS

| | | |
|---|---|---|
| JP | H06-340446 A | 12/1994 |
| JP | 2003-206111 A | 7/2003 |
| JP | 2008-103194 A | 5/2008 |
| JP | 2015-011901 A | 1/2015 |

* cited by examiner

SULFIDE SOLID ELECTROLYTE MATERIAL, LITHIUM SOLID BATTERY, AND PRODUCING METHOD FOR SULFIDE SOLID ELECTROLYTE MATERIAL

TECHNICAL FIELD

The present disclosure relates to a sulfide solid electrolyte material with high heat stability.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

A liquid electrolyte including a flammable organic solvent is used for a conventionally commercialized lithium battery, so that the installation of a safety device for restraining temperature rise during a short circuit and the structure for preventing the short circuit are necessary therefor. In contrast, the flammable organic solvent is not used in a lithium battery such that the liquid electrolyte is replaced with a solid electrolyte layer to all solidify the battery, so that the simplification of the safety device can be intended.

Patent Literature 1 discloses a method for producing a sulfide solid electrolyte material comprising steps of: an amorphizing step of obtaining a sulfide glass by amorphization of a raw material composition that contains at least $Li_2S$, $P_2S_5$, and LiI, so as to obtain a sulfide glass, and a heat treatment step of heating the sulfide glass. The object of this technique is to provide a sulfide solid electrolyte material having high Li ion conductivity.

CITATION LIST

Patent Literature

Patent Literature 1: Japanese Patent Application Laid-Open No. 2015-011901

SUMMARY OF DISCLOSURE

Technical Problem

For example, if a lithium solid battery is exposed to a high temperature, the sulfide solid electrolyte material may react with the cathode active material and may generate heat in some cases. Accordingly, demanded is a sulfide solid electrolyte material not easily reacts with a cathode active material even at a high temperature; that is, a sulfide solid electrolyte material with high heat stability.

The present disclosure has been made in view of the actual circumstances, and the main object thereof is to provide a sulfide solid electrolyte material with high heat stability.

Solution to Problem

In order to solve the problem, the present disclosure provides a sulfide solid electrolyte material comprising an ion conductor having (i) a Li element and (ii) an anion structure containing at least a P element, wherein a main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

According to the present disclosure, the ion conductor has the $PS_4^{3-}$ and $PS_3O^{3-}$ as the anion structure, but has neither $PS_2O_2^{3-}$ nor $PSO_3^{3-}$, so as to allow a sulfide solid electrolyte material with high heat stability.

The ion conductor preferably further has $PO_4^{3-}$ as the anion structure.

In the disclosure, a proportion of an O element with respect to a total of a S element and the O element in the ion conductor is preferably 20 mol % or less.

In the disclosure, the sulfide solid electrolyte material preferably comprises LiX (X is F, Cl, Br, or I) in addition to the ion conductor.

In the disclosure, the sulfide solid electrolyte material preferably comprises LiBr and LiI in addition to the ion conductor, and contains a high Li ion conductive crystal phase having a peak at a position of $2\theta=29.2°±0.5°$ in an XRD measurement using a CuKα ray, but does not contain a low Li ion conductive crystal phase having a peak at a position of $2\theta=27.8°±0.5°$.

Also, the present disclosure provides a lithium battery comprising a cathode active material layer containing a cathode active material, an anode active material layer containing an anode active material, and a solid electrolyte layer formed between the cathode active material layer and the anode active material layer, wherein the cathode active material is an oxide active material, and at least either one of the cathode active material layer and the solid electrolyte layer contains the above described sulfide solid electrolyte material.

According to the present disclosure, usage of the above described sulfide solid electrolyte material allows a lithium solid battery with high heat stability.

Also, the present disclosure provides a producing method for a sulfide solid electrolyte material, the sulfide solid electrolyte material comprising an ion conductor having (i) a Li element and (ii) an anion structure containing at least a P element; the method comprising an amorphizing step of obtaining a sulfide glass by amorphizing a raw material composition containing $Li_2S$, $P_2S_5$, and $Li_3PO_4$, and a heat treating step of obtaining the sulfide solid electrolyte material by heat treating the sulfide glass; wherein a main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

According to the present disclosure, the ion conductor has the $PS_4^{3-}$ and $PS_3O^{3-}$ as the anion structure, but has neither $PS_2O_2^{3-}$ nor $PSO_3^{3-}$, so as to allow a sulfide solid electrolyte material with high heat stability.

In the disclosure, preferably, the raw material composition further contains LiBr and LiI; a proportion of the $Li_3PO_4$ with respect to a total of the $Li_2S$, the $P_2S_5$, and the $Li_3PO_4$ is in a range of 7.5 mol % to 12.5 mol %; a heat treating temperature in the heat treating step is higher than 190° C. and lower than 210° C.; and the sulfide solid electrolyte material has a higher Li ion conductivity than that of a standard sulfide solid electrolyte material without an oxygen substitution.

In the disclosure, preferably, the raw material composition further contains LiBr and LiI; a proportion of the $Li_3PO_4$ with respect to a total of the $Li_2S$, the $P_2S_5$, and the $Li_3PO_4$ is in a range of 7.5 mol % to 12.5 mol %; and a heat treating temperature in the heat treating step is 200° C.

Advantageous Effects of Disclosure

The sulfide solid electrolyte material of the present disclosure produces the effect such that heat stability is high.

DESCRIPTION OF EMBODIMENTS

A sulfide solid electrolyte material, lithium solid battery, and producing method for the sulfide solid electrolyte material of the present disclosure are hereinafter described in details.

A. Sulfide Solid Electrolyte Material

The sulfide solid electrolyte material of the present disclosure comprises an ion conductor having (i) a Li element and (ii) an anion structure containing at least a P element, wherein a main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

According to the present disclosure, the ion conductor has the $PS_4^{3-}$ and $PS_3O^{3-}$ as the anion structure, but has neither $PS_2O_2^{3-}$ nor $PSO_3^{3-}$, so as to allow a sulfide solid electrolyte material with high heat stability. Further, the main component of the anion structure is $PS_4^{3-}$, so as to allow a sulfide solid electrolyte material with high Li ion conductivity.

Here, $PS_4^{3-}$ is an anion structure without substitution of S with O (unsubstituted body), and $PS_3O^{3-}$ is an anion structure such that 1 piece of S in $PS_4^{3-}$ is substituted with O (monosubstituted body). Similarly, $PS_2O_2^{3-}$ is an anion structure such that 2 pieces of S in $PS_4^{3-}$ are substituted with O (disubstituted body), and $PSO_3^{3-}$ is an anion structure such that 3 pieces of S in $PS_4^{3-}$ are substituted with O (trisubstituted body). In other words, the ion conductor has a monosubstituted body as the oxygen substitution body, but has neither a disubstituted body nor trisubstituted body. It has first been found out that such selective condition is effective for heat stability.

Figure 1A:
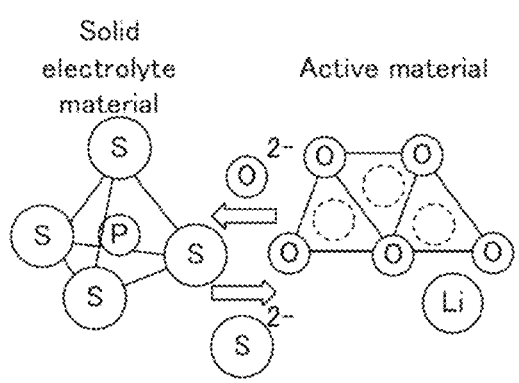
FIGS. 1A and 1B are schematic diagrams explaining a presumptive mechanism of improvement in heat stability.

Also, the reason for $PS_3O^{3-}$ (monosubstituted body) being more excellent in heat stability than $PS_4^{3-}$ (unsubstituted body) is presumed as follows. First, as shown in FIG. 1A, when a sulfide solid electrolyte material having $PS_4^{3-}$ and contacting with an oxide active material is exposed to a high temperature, the mutual diffusion of $S^{2-}$(or a S radical) and $O^{2-}$ (or an O radical) occurs. Incidentally, the more high-oxidized state the oxide active material becomes, that is, for example, the more charged state the cathode active material becomes, the more actively $O^{2-}$ (or an O radical) is transported from the oxide active material. Alternatively, although not illustrated, $O_2$ gas may be generated along with the transportation of $O_2$ inside the oxide active material, and thus the $O_2$ gas may possibly oxide the sulfide solid electrolyte material.

Figure 1B:
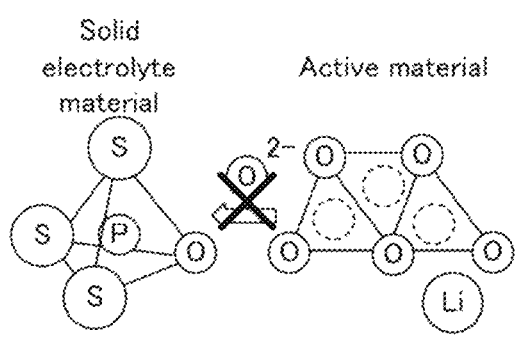

In contrast, as shown in FIG. 1B, even when the sulfide solid electrolyte material having $PS_3O^{3-}$ (the anion structure such that S of $PS_4^{3-}$ is partially solid-solution substituted with an oxide) and contacting with an oxide active material is exposed to a high temperature, the anion structure has O so that the transportation of $O^{2-}$ (or an O radical) from the oxide active material may be restrained; or, although not illustrated, $O_2$ gas have difficulty in oxidizing the sulfide solid electrolyte material thereby. Heat stability is presumed to be improved as the result.

On the other hand, focusing on the transportation of $O^{2-}$ (or an O radical) from the oxide active material, the anion structure such that the oxygen substitution is more than in $PS_3O^{3-}$ (monosubstituted body) is considered to have higher heat stability. In fact, $PO_4^{3-}$ is high in heat stability although low in Li ion conductivity. However, as described later in Examples, surprisingly, $PSO_3^{3-}$ (trisubstituted body) in which the oxygen substitution was more than in $PS_3O^{3-}$ (monosubstituted body) was lower in heat stability than $PS_3O^{3-}$ (monosubstituted body). The reason therefor is presumed to be other factor than the transportation of $O^{2-}$ (or an O radical). In specific, it is presumed that the deformation of the tetrahedron structure in the anion structure increases, so that heat stability as a material is deteriorated on the contrary.

Based on such finding, the present disclosure defines the selective condition for the oxygen substitution body of $PS_4^{3-}$ such that neither the disubstituted body nor trisubstituted body are present but the monosubstituted body is present. Thereby, the effect by the deformation of the tetrahedron structure may be minimized while restraining the transportation of $O^{2-}$ (or an O radical) from the oxide active material. As the result, heat stability may be improved while utilizing the characteristic of $PS_4^{3-}$ having high Li ion conductivity.

Incidentally, as described later in Examples, amorphizing and heat treating a raw material composition containing $Li_2S$, $P_2S_5$, and $Li_3PO_4$ may have been already known as itself. However, the result of both amorphizing and heat treating are changed in accordance with the conditions; thus, the selective condition such that neither the disubstituted body nor trisubstituted body are present but the monosubstituted body is present may not be obtained immediately after amorphizing and heat treating; setting the condition based on the finding is necessary.

The sulfide solid electrolyte material of the present disclosure comprises an ion conductor having (i) a Li element and (ii) an anion structure containing at least a P element. Also, the main component of the anion structure is $PS_4^{3-}$.

"The main component" means that the proportion of the component is the most in the anion structure containing a P element. Also, the ion conductor has the $PS_4^{3-}$ and $PS_3O^{3-}$ as the anion structure, but has neither $PS_2O_2^{3-}$ nor $PSO_3^{3-}$.

The ion conductor may have only $PS_4^{3-}$ and $PS_3O^{3-}$ as the anion structure, and may have other anion structures except for $PS_2O_2^{3-}$ and $PSO_3^{3-}$ to the extent that allows the desired effects to be obtained. Examples of the other anion structures may include $P_2S_6^{4-}$. The total proportion of $PS_4^{3-}$ and $PS_3O^{3-}$ with respect to the whole anion structures of the ion conductor is: 50 mol % or more for example, preferably 70 mol % or more, and more preferably 90 mol % or more.

Whether the ion conductor has $PS_4^{3-}$ and $PS_3O^{3-}$ as the anion structure may be determined by $^{31}$P-NMR measurement. In specific, the peak of $PS_4^{3-}$ is observed as the main peak and the peak of $PS_3O^{3-}$ is observed together therewith in the $^{31}$P-NMR measurement. Incidentally, the main peak refers to the peak with the largest intensity among the peaks of the anion structure containing at least a P element.

With the measurement conditions described in Examples layer, the peak of $PS_4^{3-}$ and $PS_3O^{3-}$ appeared at 88 ppm and 78 ppm respectively. These peak intensities are regarded as $I_1$ and $I_2$ respectively. Incidentally, the peak position of $PS_4^{3-}$ and $PS_3O^{3-}$ are closed to each other; thus, $I_1$ and $I_2$ are preferably determined by separating the peaks. The value of $I_2/I_1$ is 0.1 or more for example, and preferably 0.2 or more. If the value of $I_2/I_1$ is too small, heat stability may not be sufficiently improved. Meanwhile, the value of $I_2/I_1$ is 0.9 or less for example, and may be 0.7 or less.

Also, the ion conductor may further have $PO_4^{3-}$ as the anion structure, and may not have $PO_4^{3-}$. The former case is advantageous for improving heat stability furthermore, and the latter case is advantageous for inhibiting the decrease in Li ion conductivity. In the former case, the total proportion of $PS_4^{3-}$, $PS_3O^{3-}$ and $PO_4^{3-}$ with respect to the whole anion structures of the ion conductor is: 70 mol % or more for example, and preferably 90 mol % or more.

Whether the ion conductor has $PO_4^{3-}$ as the anion structure or not may be determined by $^{31}$P-NMR measurement. In specific, the peak of $PO_4^{3-}$ may be observed and may not be observed in the $^{31}$P-NMR measurement. In the former case, it is preferable that specifically the peak of a crystal $PO_4^{3-}$ is observed. For example, the peak of the crystal $PO_4^{3-}$ is easily observed if a raw material composition containing $Li_3PO_4$ is used for the synthesis.

With the measurement conditions described in Examples later, the peak of $PO_4^{3-}$ appeared at 10 ppm or 8 ppm. This peak intensity is regarded as $I_3$. The value of $I_3/I_1$ is 0.1 or more for example, may be 0.2 or more, and may be 0.3 or more. Meanwhile, the value of $I_3/I_1$ is 0.9 or less for example, and may be 0.7 or less.

Whether the ion conductor has neither $PS_2O_2^{3-}$ nor $PSO_3^{3-}$ as the anion structure may be determined by $^{31}$P-NMR measurement. In specific, the peak of $PS_2O_2^{3-}$ and $PSO_3^{3-}$ are not observed in the $^{31}$P-NMR measurement. With the measurement conditions described in Examples layer, the peak of $PS_2O_2^{3-}$ appeared at 65 ppm. The intensity at this position is regarded as $I_4$. In the same manner, with the measurement conditions described in Examples layer, the peak of $PSO_3^{3-}$ appeared at 37 ppm or 34 ppm. The intensity at this position is regarded as $I_5$. Usually, the peak of neither $PS_2O_2^{3-}$ nor $PSO_3^{3-}$ are observed in the $^{31}$P-NMR measurement; however, if it is difficult to judge whether a peak falls under the peak or not, when the value of $I_4/I_1$ and the value of $I_5/I_1$ are 0.05 or less (5% or less) respectively, it may be judged that the ion conductor has the peak of neither $PS_2O_2^{3-}$ nor $PSO_3^{3-}$.

A proportion of the O element with respect to a total of a S element and the O element in the ion conductor is: usually more than 0, may be 0.5 mol % or more, and may be 1 mol % or more. Meanwhile, the proportion of the O element is 20 mol % or less for example, and may be 15 mol % or less. Also, the composition of the ion conductor is preferably represented by $Li_3P(S_{(1-x)}O_x)_4$ (x satisfies $0<x\leq0.2$).

The sulfide solid electrolyte material of the present disclosure may comprise only the ion conductor, but preferably further comprises LiX (X is F, Cl, Br, or I). The reason therefor is to improve Li ion conductivity. Also, X is preferably Cl, Br, or I, and more preferably Br or I. Also, two or more kinds of the LiX may be used. In particular, in the present disclosure, LiBr and LiI are preferably used as the LiX.

Also, the LiX is preferably present in the state taken into the structure of the ion conductor as a LiX component (LiF component, LiI component, LiBr component, and LiCl component). In other words, the sulfide solid electrolyte material of the present disclosure preferably contains the ion conductor and the LiX in the physically inseparable state but not as a simple mixture of the ion conductor and the LiX. The proportion of the LiX in the sulfide solid electrolyte material is 1 mol % or more for example, may be 5 mol % or more, and may be 10 mol % or more. Meanwhile, the proportion of the LiX is 40 mol % or less for example, may be 35 mol % or less, and may be 30 mol % or less. Incidentally, when two or more kinds of the LiX are used, it is preferable that the total of the LiX is in the above range.

In particular, preferably, the sulfide solid electrolyte material of the present disclosure comprises LiBr and LiI in addition to the ion conductor, and contains a high Li ion conductive crystal phase having a peak at a position of $2\theta=29.2°\pm0.5°$ in an XRD measurement using a CuKα ray, but does not contain a low Li ion conductive crystal phase having a peak at a position of $2\theta=27.8°\pm0.5°$.

The high Li ion conductive crystal phase (referred to as the crystal phase A in some cases) usually has a characteristic peak at the position of $2\theta=20.1°\pm0.5°$, $23.5°\pm0.5°$, and $29.2°\pm0.5°$. On the other hand, the low Li ion conductive crystal phase (referred to as the crystal phase B in some cases) is a crystal phase with lower Li ion conductivity than that of the crystal phase A, and usually has a characteristic peak at the position of $2\theta=27.8°\pm0.5°$ and $32.1°\pm0.5°$. The crystal phase B is presumed to be a solid liquid of LiI—$Li_3PS_4$. Incidentally, each peak position is in the range of $\pm0.5°$ since the crystal lattice is slightly changed in accordance with factors such as the material composition. Each peak position may be in a range of $\pm0.3°$ and may be in a range of $\pm0.10°$.

The sulfide solid electrolyte material of the present disclosure is usually a material having crystallinity, and preferably glass ceramics. Also, the sulfide solid electrolyte material of the present disclosure is preferably high in Li ion conductivity. The Li ion conductivity at a normal temperature (25° C.) is: $1\times10^{-3}$ S/cm or more for example, preferably $2.5\times10^{-3}$ S/cm or more, and more preferably $4\times10^{-3}$ S/cm or more. The heat generation start temperature of the sulfide solid electrolyte material of the present disclosure in the later described DSC measurement is: preferably 200° C. or more for example, and more preferably 230° C. or more.

Examples of the shape of the sulfide solid electrolyte material of the present disclosure may include a granular shape. Also, the average particle diameter ($D_{50}$) of the sulfide solid electrolyte material is in a range of 0.1 μm to 50 μm for example. The use of the sulfide solid electrolyte material is not particularly limited, and examples thereof may include an arbitrary use that utilizes the Li ion conductivity. Above all, the sulfide solid electrolyte material of the present disclosure is preferably used in a lithium solid battery.

B. Lithium Solid Battery

Figure 2:
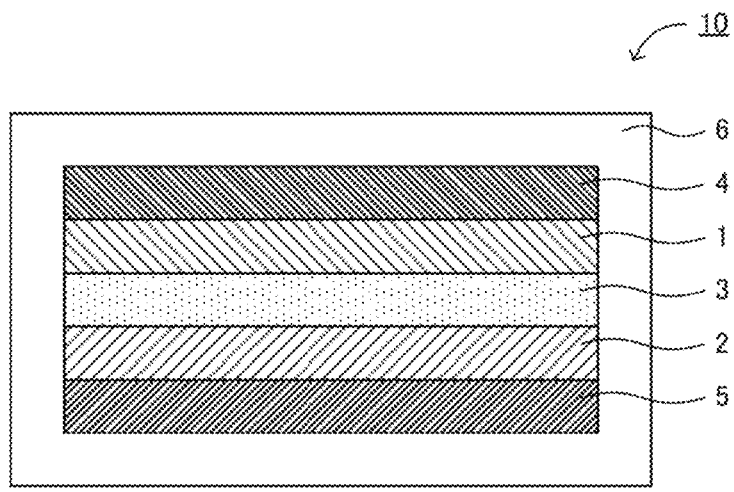
FIG. 2 is a schematic sectional view illustrating an example of a lithium solid battery of the present disclosure.

FIG. 2 is a schematic sectional view illustrating an example of a lithium solid battery of the present disclosure. Lithium solid battery 10 illustrated in FIG. 2 comprises cathode active material layer 1 containing a cathode active material, anode active material layer 2 containing an anode active material, solid electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. Further, the cathode active material (not illustrated) is an oxide active material, and at least either one of cathode active material layer 1 and solid electrolyte layer 3 contains the sulfide solid electrolyte material described in "A. Sulfide solid electrolyte material" above.

According to the present disclosure, usage of the above-described sulfide solid electrolyte material allows a lithium solid battery with high heat stability.

The lithium battery of the present disclosure is hereinafter described in each constitution.

1. Cathode Active Material Layer

The cathode active material layer in the present disclosure is a layer containing at least a cathode active material. The cathode active material layer may contain at least one of a solid electrolyte material, a conductive material, and a binder other than the cathode active material.

The cathode active material in the present disclosure is usually an oxide active material. Specific examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$, spinel type active materials such as $LiMn_2O_4$, and $Li(Ni_{0.5}Mn_{1.5})O_4$, and olivine type active materials such as $LiFePO_4$, $LiMnPO_4$, $LiNiPO_4$, and $LiCuPO_4$. Also, an arbitrary polyanionic active material containing polyanion such as $PO_4^{3-}$, $SiO_4^{4-}$, and $BO_3^{3-}$ may be used as the cathode active material. The operation potential of the cathode active material is preferably 3.0 V (Li/Li⁻) or more.

The surface of the cathode active material may be coated with a coating layer. The reason therefor is to inhibit the cathode active material from reacting with the sulfide solid electrolyte material. Examples of the materials for the coating layer may include Li ion conductive oxides such as $LiNbO_3$, $Li_3PO_4$, and LiPON. The average thickness of the coating layer is preferably in a range of 1 nm to 20 nm for example, and more preferably in a range of 1 nm to 10 nm.

The proportion of the cathode active material in the cathode active material layer is 40 volume % or more for example, and preferably 50 volume % or more. Meanwhile, the proportion of the cathode active material is 99 volume % or less for example.

The cathode active material layer in the present disclosure preferably contains the above-described sulfide solid electrolyte material. The proportion of the sulfide solid electrolyte material in the cathode active material layer is 1 volume % or more for example, and preferably 10 volume % or more. Meanwhile, the proportion of the sulfide solid electrolyte material is 60 volume % or less for example, and preferably 50 volume % or less.

Also, the conductive material is in the same contents as the description above. Examples of the binder may include fluoride-containing binders such as polyvinylidene fluoride (PVDF). Also, the thickness of the cathode active material layer is in a range of 0.1 μm to 1000 μm, for example.

2. Solid Electrolyte Layer

The solid electrolyte layer in the present disclosure is a layer containing at least a solid electrolyte material. Also, the solid electrolyte layer may contain a binder other than the solid electrolyte material. The solid electrolyte material and the binder are in the same contents as the descriptions above. The solid electrolyte material in the present disclosure preferably contains the above-described sulfide solid electrolyte material. The thickness of the solid electrolyte layer is in a range of 0.1 μm to 1000 μm, for example.

3. Anode Active Material Layer

The anode active material layer in the present disclosure is a layer containing at least an anode active material. Also, the anode active material layer may contain at least one of a solid electrolyte material, a conductive material, and a binder, other than the anode active material.

Examples of the anode active material may include a metal active material and a carbon active material. Examples of the metal active material may include In, Al, Si and Sn. On the other hand, examples of the carbon active material may include mesocarbon microbeads (MCMB), highly oriented pyrolytic graphite (HOPG), hard carbon, and soft carbon.

The conductive material, the binder, and the solid electrolyte material are in the same contents as the descriptions above. The anode active material layer in the present disclosure may contain the above-described sulfide solid electrolyte material. The thickness of the anode active material layer is in a range of 0.1 μm to 1000 μm for example.

4. Other Constitutions

The lithium solid battery of the present disclosure usually has a cathode current collector for collecting currents of the cathode active material layer and an anode current collector for collecting currents of the anode active material layer. Examples of the material for the cathode current collector may include SUS, aluminum, nickel, iron, titanium, and carbon. On the other hand, examples of the material for the anode current collector may include SUS, copper, nickel, and carbon. Also, a battery case for a general battery such as a battery case made of SUS may be used for the battery case.

5. Lithium Solid Battery

The lithium solid battery of the present disclosure may be a primary battery and may be a secondary battery, but preferably a secondary battery among them. The reason therefor is to be repeatedly charged and discharged and be useful as a car-mounted battery, for example. Incidentally, the primary battery includes usage of the secondary battery as a primary battery (usage for the purpose of just one time discharge after charging). Examples of the shape of the lithium solid battery may include a coin shape, a laminate shape, a cylindrical shape, and a rectangular shape.

C. Producing Method for Sulfide Solid Electrolyte Material

Figure 3:
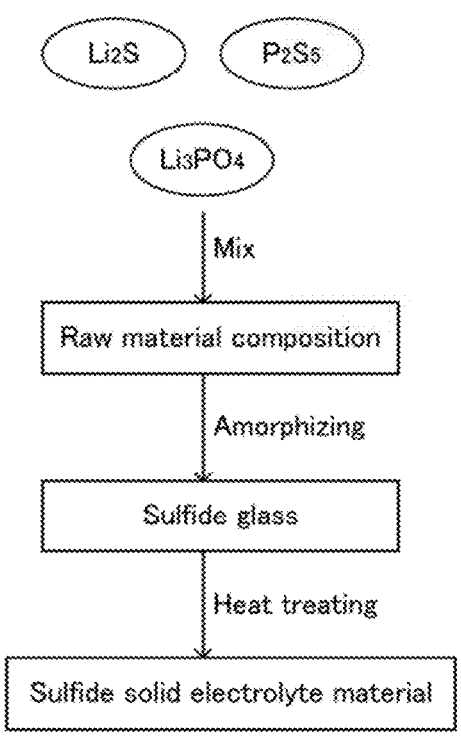
FIG. 3 is a schematic diagram illustrating an example of a producing method for a sulfide solid electrolyte material of the present disclosure.

FIG. 3 is a schematic diagram showing an example of a producing method for the sulfide solid electrolyte material of the present disclosure. In FIG. 3, a raw material composition is prepared by mixing $Li_2S$, $P_2S_5$, and $Li_3PO_4$. Next, the raw material composition is amorphized by mechanical milling for example so as to obtain a sulfide glass. Next, the sulfide glass is heat treated so as to obtain a sulfide solid electrolyte material. The sulfide solid electrolyte material to be obtained is such that the main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

According to the present disclosure, the ion conductor has the $PS_4^{3-}$ and $PS_3O^{3-}$ as the anion structure, but has neither $PS_2O_2^{3-}$ nor $PSO_3^{3-}$, so that a sulfide solid electrolyte material with high heat stability may be obtained. Further, a high Li ion conductive sulfide solid electrolyte material may be obtained since the main component of the anion structure is $PS_4^{3-}$.

The producing method for the sulfide solid electrolyte material of the present disclosure is hereinafter described in details.

1. Amorphizing Step

The amorphizing step in the present disclosure is a step of obtaining a sulfide glass by amorphizing a raw material composition containing $Li_2S$, $P_2S_5$, and $Li_3PO_4$.

The raw material composition contains at least $Li_2S$, $P_2S_5$, and $Li_3PO_4$. The $Li_2S$, $P_2S_5$, and $Li_3PO_4$ are the constituent of the ion conductor. Also, the raw material composition may contain only $Li_2S$, $P_2S_5$, and $Li_3PO_4$, and may further contain another raw material. Examples of the other raw material may include LiX (X is F, Cl, Br, or I). The LiX is added so that the sulfide solid electrolyte material with high Li ion conductivity may be obtained. Incidentally, the raw material composition may contain only $Li_2S$, $P_2S_5$, $Li_3PO_4$, and LiX.

The proportion of $Li_2S$ with respect to the total of $Li_2S$ and $P_2S_5$ in the raw material composition is: 70 mol % or more for example, may be 72 mol % or more, and may be 74 mol % or more. Meanwhile, the proportion of the $Li_2S$ is: 80 mol % or less for example, may be 78 mol % or less, and may be 76 mol % or less. Stoichiometrically, only the $PS_4^{3-}$ structure is formed when $Li_2S:P_2S_5=75:25$.

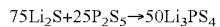

$$75Li_2S+25P_2S_5 \rightarrow 50Li_3PS_4$$

In the raw material composition, the proportion of the $Li_3PO_4$ with respect to the total of the $Li_2S$, the $P_2S_5$, and the $Li_3PO_4$ is: usually more than 0, may be 0.5 mol % or more, and may be 1 mol % or more. Meanwhile, the proportion of the $Li_3PO_4$ is 20 mol % or less for example, and may be 15 mol % or less. For example, if the composition of the ion conductor is represented by $Li_3P(S_{(1-x)}O_x)_4$, the proportion of the $Li_3PO_4$ matches the oxygen substitution amount "x".

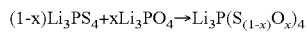

$$(1-x)Li_3PS_4+xLi_3PO_4 \rightarrow Li_3P(S_{(1-x)}O_x)_4$$

The raw material composition may further contain LiX (X is F, Cl, Br, or I). The proportion of the LiX is in the same contents as the description in "A. Sulfide solid electrolyte material" above.

In the amorphizing step, the raw material composition containing $Li_2S$, $P_2S_5$, and $Li_3PO_4$ is amorphized to obtain a sulfide glass. Examples of the method for amorphizing the raw material composition may include a mechanical milling method such as a ball mill and vibrator mill, and a melt quenching method. The mechanical milling method may be dry and may be wet, but the latter is preferable from the viewpoint of the uniform treatment. The kind of the dispersion medium to be used for the wet mechanical milling is not particularly limited.

Various conditions for the mechanical milling are set so as to obtain the desired sulfide glass. For example, when a planetary ball mill is used, the raw material composition and a ball for crushing thereof are put into the machine, and subjected to the treatment at the specific revolution number for the specific time. In general, larger the revolution number becomes, faster the production speed of the sulfide glass becomes; longer the treatment time becomes, higher the conversion ratio from the raw material composition to the sulfide glass becomes. The number of the soleplate revolution for the planetary ball milling is in a range of 200 rpm to 500 rpm for example, and may be in a range of 250 rpm to 400 rpm. Also, the treatment time for the planetary ball milling is in a range of 1 hour to 100 hours, and may be in a range of 1 hour to 70 hours.

The sulfide glass to be obtained by amorphizing preferably does not have the peak derives from a crystal in XRD measurement.

2. Heat Treating Step

The heat treating step in the present disclosure is a step of obtaining the sulfide solid electrolyte material by heat treating the sulfide glass.

The heat treating temperature in the heat treating step is 150° C. or more for example, and may be 180° C. or more. Meanwhile, the heat treating temperature is 300° C. or less for example, and may be 250° C. or less. The heating time is appropriately adjusted so as to obtain the desired crystal phase; however, it is in a range of 1 hour to 3 hours for example. Examples of the heating atmosphere may include an inert gas atmosphere and a vacuum.

In particular, in the present disclosure, preferably, the raw material composition further contains LiBr and LiI in addition to $Li_2S$, $P_2S_5$, and $Li_3PO_4$; the proportion of the $Li_3PO_4$ with respect to the total of the $Li_2S$, the $P_2S_5$, and the $Li_3PO_4$ is in a range of 7.5 mol % to 12.5 mol %; the heat treating temperature in the heat treating step is higher than 190° C. and lower than 210° C.; and the sulfide solid electrolyte material has a higher Li ion conductivity than that of a standard sulfide solid electrolyte material without an oxygen substitution.

Here, the "standard sulfide solid electrolyte material without an oxygen substitution" refers to a sulfide solid electrolyte material synthesized in the same manner except that $Li_3PS_4$ ($0.75Li_2S \cdot 0.25P_2S_5$) is used instead of $Li_3PO_4$ which is an oxygen source. As described in Examples later, when the proportion of $Li_3PO_4$ was in the range of 7.5 mol % to 12.5 mol % and the heat treating temperature in the heat treating step was higher than 190° C. and lower than 210° C., surprisingly, the Li ion conductivity was improved. However, the synthesis conditions for the sulfide solid electrolyte material are comparatively sensitive to a heat treating temperature; thus, verifiably, it was clarified that the higher Li ion conductivity than that of the "standard sulfide solid electrolyte material without an oxygen substitution" was obtained. In particular, the heat treating temperature is preferably 200° C.

3. Sulfide Solid Electrolyte Material

The sulfide solid electrolyte material to be obtained by the present disclosure is in the same contents as the description in "A. Sulfide solid electrolyte material" above; thus, the description herein is omitted.

Incidentally, the present disclosure is not limited to the embodiments. The embodiments are exemplification, and other variations are intended to be included in the technical scope of the present disclosure if they have substantially the same constitution as the technical idea described in the claims of the present disclosure and have similar operation and effect thereto.

EXAMPLES

The present disclosure is hereinafter described in more details with reference to examples.

Example 1

A sulfide solid electrolyte material was synthesized by a dry synthesis method. First, $Li_2S$, $P_2S_5$, LiI, LiBr, and Li$_3$PO$_4$ were used as the raw materials. Mixed were 0.5157 g of Li$_2$S, 0.8317 g of P$_2$S$_5$, 0.2819 g of LiI, 0.2744 g of LiBr, and 0.0963 g of Li$_3$PO$_4$ to obtain a raw material composition. The obtained raw material composition was projected into a ZrO$_2$ pot (45 ml); further, 4 g of heptane and a ZrO$_2$ ball (approximately 53 g) were projected thereinto to hermetically seal the pot completely. The hermetically sealed pot was mounted on a planetary ball mill machine (P7™ manufactured by FRITSCH JAPAN CO, LTD.) to perform mechanical milling at the number of soleplate revolutions of 500 rpm, for 1 hour and 15 minutes pause as a set, 20 sets. Thereafter the heptane was removed by drying at 100° C. for 1 hour on a hot plate inside the glove box to obtain a sulfide glass.

The obtained 200 mg of the sulfide glass was formed into a pellet and vacuum sealed in a quartz tube; thereafter heat treated at 180° C. for 2 hours in a muffle furnace. Thereby, a sulfide solid electrolyte material was obtained. The composition of the obtained sulfide solid electrolyte material corresponded to "x"=0.1 (oxygen substitution amount: 10 mol %) in 10LiI.15LiBr.75(Li$_3$P(S$_{(1-x)}$O$_x$)$_4$). Incidentally, a cracking treatment was appropriately conducted to uniform the particle size of the obtained sulfide solid electrolyte material.

Example 2

A sulfide solid electrolyte material was synthesized by a dry synthesis method. First, the same raw materials as in Example 1 were projected into a ZrO$_2$ pot (45 ml). Further, ZrO$_2$ balls (φ=10 mm, 10 pieces) were projected thereinto to hermetically seal the pot completely. The hermetically sealed pot was mounted on a planetary ball mill machine (P7™ manufactured by FRITSCH JAPAN CO, LTD.) to perform mechanical milling at the number of soleplate revolutions of 400 rpm, for 1 hour and 5 minutes pause as a set, 40 sets. Thereby, a sulfide glass was obtained. A sulfide solid electrolyte material was obtained in the same manner as in Example 1 except that the obtained sulfide glass was used.

Example 3

A sulfide solid electrolyte material was obtained in the same manner as in Example 1 except that the composition of the sulfide solid electrolyte material was changed to "x"=0.025 (oxygen substitution amount: 2.5 mol %) in 10LiI.15LiBr.75(Li$_3$P(S$_{(1-x)}$O$_x$)$_4$).

Example 4

A sulfide solid electrolyte material was obtained in the same manner as in Example 1 except that the composition of the sulfide solid electrolyte material was changed to "x"=0.075 (oxygen substitution amount: 7.5 mol %) in 10LiI.15LiBr.75(Li$_3$P(S$_{(1-x)}$O$_x$)$_4$).

Comparative Example 1

A sulfide solid electrolyte material was obtained in the same manner as in Example 1 except that the composition of the sulfide solid electrolyte material was changed to "x"=0 (oxygen substitution amount: 0 mol %) in 10LiI.15LiBr.75(Li$_3$P(S$_{(1-x)}$O$_x$)$_4$).

Comparative Example 2

A sulfide solid electrolyte material was synthesized by using P$_2$O$_5$ instead of Li$_3$PO$_4$. Mixed were 0.5648 g of Li$_2$S, 0.7651 g of P$_2$S$_5$, 0.2924 g of LiI, 0.2847 g of LiBr, and 0.0931 g of P$_2$O$_5$ to obtain a raw material composition. A sulfide solid electrolyte material was obtained in the same manner as in Example 1 except that the obtained raw material composition was used. The composition of the obtained sulfide solid electrolyte material corresponded to "x"=0.1 (oxygen substitution amount: 10 mol %) in 10LiI.15LiBr.75(Li$_3$P(S$_{(1-x)}$O$_x$)$_4$).

Comparative Example 3

A sulfide solid electrolyte material was obtained in the same manner as in Comparative Example 2 except that the composition of the sulfide solid electrolyte material was changed to "x"=0.025 (oxygen substitution amount: 2.5 mol %) in 10LiI.15LiBr.75(Li$_3$P(S$_{(1-x)}$O$_x$)$_4$).

Comparative Example 4

A sulfide solid electrolyte material was obtained in the same manner as in Comparative Example 2 except that the composition of the sulfide solid electrolyte material was changed to "x"=0.075 (oxygen substitution amount: 7.5 mol %) in 10LiI.15LiBr.75(Li$_3$P(S$_{(1-x)}$O$_x$)$_4$).

Comparative Example 5

A sulfide solid electrolyte material was obtained in the same manner as in Comparative Example 2 except that the composition of the sulfide solid electrolyte material was changed to "x"=0.25 (oxygen substitution amount: 25 mol %) in 10LiI.15LiBr.75(Li$_3$P(S$_{(1-x)}$O$_x$)$_4$).

[Evaluation]
(DSC Evaluation)

Produced was the evaluation cell in which the sulfide solid electrolyte material obtained in Examples 1 to 4 and Comparative Examples 1 to 5 was contained in the cathode active material layer. The evaluation cell was charge, and thereafter the cathode active material layer in the charged state was collected; the collected cathode active material layer was subjected to a differential scanning calorimetry (DSC).

The production method for the evaluation cell was as follows. The obtained sulfide solid electrolyte material and LiCo$_{1/3}$Ni$_{1/3}$Mn$_{1/3}$O$_2$ (cathode active material) having a coating layer of lithium niobate on the surface were mixed at the volume ratio of: sulfide solid electrolyte material: cathode active material=25:75, thereafter dispersed to butyl butyrate, which was a dispersion medium. Further, a vapor-grown carbon fiber (conductive material) and a PVDF solution (binder) were added thereto. The obtained mixture was put in a container, dispersed by an ultrasonic dispersion device for 30 seconds, and sequentially shaken by a shaker for 5 minutes to obtain cathode slurry. A cathode current collector (carbon-coated aluminum foil) was coated with the obtained cathode slurry by a doctor blade method and dried at 100° C. for 30 minutes; thereafter cut in a circle shape having 1 cm$^2$ area to obtain a cathode.

Also, the obtained sulfide solid electrolyte material and graphite (anode active material) were dispersed to butyl butyrate, which was a dispersion medium. Further, a PVDF solution (binder) was added thereto. The obtained mixture was put in a container, dispersed by an ultrasonic dispersion device for 30 seconds, and sequentially shaken by a shaker for 5 minutes to obtain anode slurry. An anode current collector (copper foil) was coated with the obtained anode slurry by a doctor blade method and dried at 100° C. for 30 minutes; thereafter cut in a circle shape having 1 cm² area to obtain an anode.

Also, the obtained sulfide solid electrolyte material was dispersed to heptane, which was a dispersion medium. Further, a BR solution (butylene rubber solution, binder) was added thereto. The obtained mixture was put in the container, dispersed by an ultrasonic dispersion device for 30 seconds, and sequentially shaken by a shaker for 5 minutes to obtain slurry for forming a solid electrolyte layer. A substrate (aluminum foil) was coated with the obtained slurry and dried at 100° C. for 30 minutes; thereafter cut in a circle shape having 1 cm² area, and the substrate was peeled off to obtain a solid electrolyte layer.

The obtained cathode, solid electrolyte layer, and anode were laminated in this order to form a laminated body. This laminated body was pressed at the pressure of 600 MPa at room temperature (25° C.). The pressed laminated body was stored in a case and a restraining pressure of 6 N was applied thereto. Thereby, an evaluation cell was obtained. Next, the obtained evaluation cell was charged so that the state of charge (SOC) of the cathode active material layer became 100%. In specific, constant current charge (CC charge) with the cut off voltage of 4.55 V was conducted; thereafter constant voltage charge (CV charge) was conducted until the theoretical capacity. After that, the charged-state cathode active material layer was collected from the evaluation cell.

The charged-state cathode active material layer of 5 mg was put in a measurement container made of SUS and sealed. A measurement by a DSC measurement apparatus (DSC60A Plus manufactured by Shimazu Corporation) was conducted therefor by using an empty measurement container made of SUS as a reference. The containers were heated to 500° C. with the temperature rising speed of 10° C./minute. The results are shown in FIG. 4 and FIG. 5.

Figure 4:
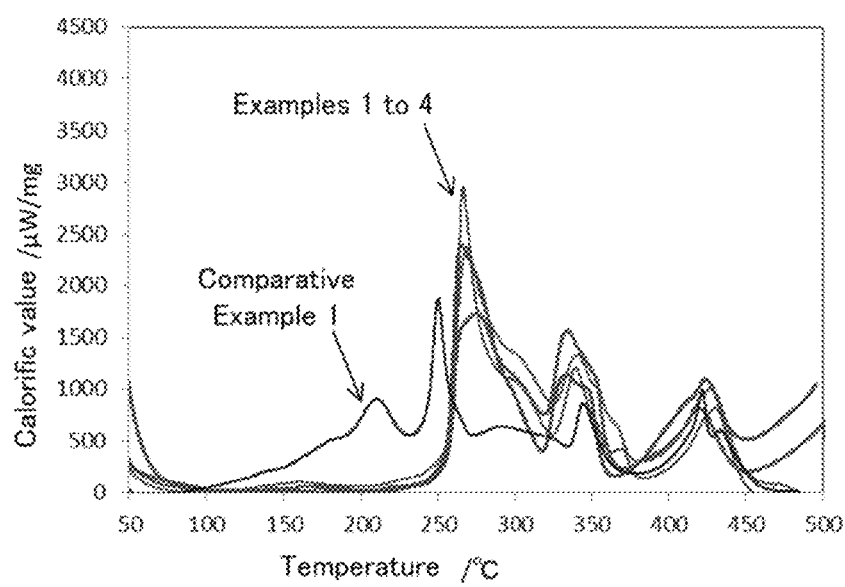
FIG. 4 is the result of DSC for the cathode active material layer that uses the sulfide solid electrolyte material obtained in Examples 1 to 4 and Comparative Example 1.

As shown in FIG. 4, in Comparative Example 1, the heat generation start temperature was approximately 100° C., while the heat generation start temperature in Examples 1 to 4 was approximately 230° C. In this manner, by introducing an O element, the heat generation start temperature shifted approximately 130° C. to the high temperature side. Also, Examples 1 and 2 are different in the synthesis method for the sulfide solid electrolyte material, and Examples 1, 3, and 4 are different in the oxygen substitution amount; however, all showed the similar exothermic behavior. Incidentally, a large exothermic peak appeared at approximately 260° C. in Examples 1 to 4; however, this exothermic peak was presumed to be a peak caused when the $H_2S$ generated by a water molecule desorbed from the sulfide solid electrolyte material was burned.

Figure 5:
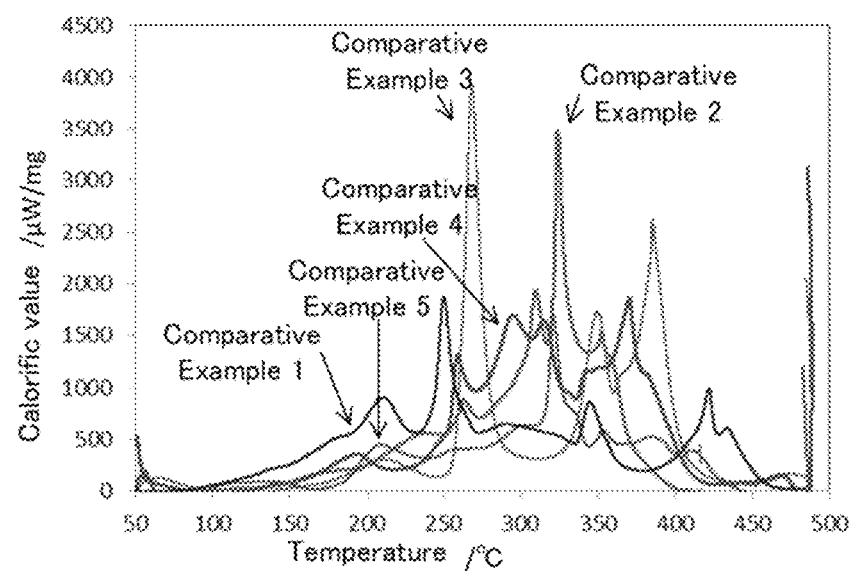
FIG. 5 is the result of DSC for the cathode active material layer that uses the sulfide solid electrolyte material obtained in Comparative Examples 1 to 5.

On the other hand, as shown in FIG. 5, observing the calorific value (integrated value) at 100° C. to 180° C., while the calorific value in Comparative Examples 2 to 5 became smaller than the calorific value in Comparative Example 1, the heat generation start temperature was approximately 100° C. in Comparative Examples 2 to 5, which was almost the same as that in Comparative Example 1. Also, it was confirmed that a large exothermic reaction occurred at a temperature of 180° C. or more in all Comparative Examples 2 to 5. In these manners, in Examples 1 to 4, $Li_3PO_4$ was used as the oxygen source so that the heat generation start temperature shifted to a high temperature side; however, in Comparative Examples 2 to 5, the heat generation start temperature did not shift to a high temperature side even by using $P_2O_5$ as the oxygen source. Then, $^{31}$P-NMR measurement was conducted to search for the structural effect given by the difference in oxygen source.

($^{31}$P-NMR Measurement)

$^{31}$P-NMR measurement was conducted for the sulfide solid electrolyte material obtained in Examples 1 to 4 and Comparative Examples 1 to 5. The measurement conditions were as follows:

Device: INOVA300 (manufactured by Agilent Technologies, Inc.)
Test tube: 7 mm φ $ZrO_2$ rotor
Revolution number: 7000 Hz
Standard: phosphoric acid=0 ppm
Integration times: 1000 to 1500 Gain=54

Figure 6:
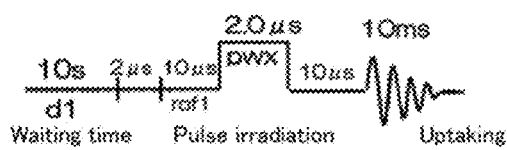
FIG. 6 is a schematic diagram illustrating the pulse condition in $^{31}$P-NMR measurement.

Also, the pulse condition is shown in FIG. 6. The obtained representative result is shown in FIG. 7.

Figure 7:
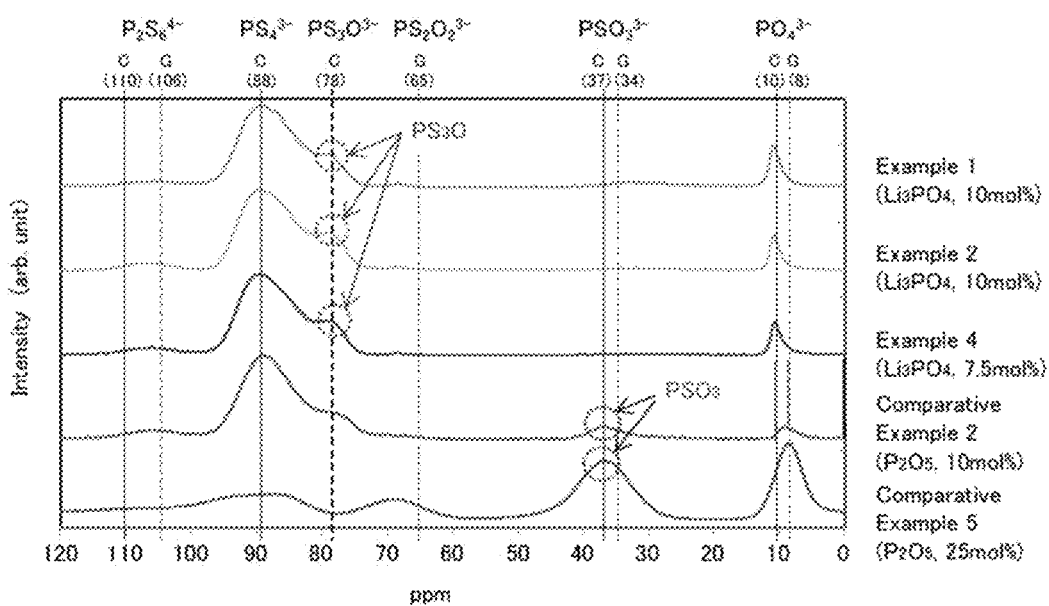
FIG. 7 is the result of the $^{31}$P-NMR measurement for the sulfide solid electrolyte material obtained in Examples 1 to 4 and Comparative Examples 1 to 5.

As shown in FIG. 7, in Examples 1, 2, and 4, the peak of the crystal $PS_4^{3-}$ was observed at 88 ppm as the main peak, and the peak of the crystal $PS_3O^3$ was observed at 78 ppm. Also, when the peak intensity at 88 ppm was regarded as $I_1$ and the peak intensity at 78 ppm was regarded as $I_2$, the value of $I_2/I_1$ was about 0.3 to 0.5 in Examples 1, 2, and 4.

Also, as shown in FIG. 7, in Examples 1, 2, and 4, the peak of the crystal $PO_4^{3-}$ was observed at 10 ppm. This peak was presumed to be a peak derived from the raw material $Li_3PO_4$. When the peak intensity at 10 ppm was regarded as $I_3$, the value of $I_3/I_1$ was about 0.3 to 0.5 in Examples 1, 2, and 4. Incidentally, neither the peak of $PS_2O_2^{3-}$ (disubstituted body) nor the peak of $PSO_3^{3-}$ (trisubstituted body) was observed in Examples 1, 2, and 4.

On the other hand, as shown in FIG. 7, in Comparative Example 2, although the peaks of $PS_4^{3-}$ (unsubstituted body) and $PS_3O^{3-}$ (monosubstituted body) were observed, the peak of $PSO_3^{3-}$ (trisubstituted body) was also observed at 37 ppm. Also, comparing Comparative Examples 2 and 5, it was suggested that $PSO_3^{3-}$ (trisubstituted body) tended to increase along with the increase of the $P_2O_5$ content since the solid solution of the O element with respect to the S element was promoted thereby.

From the above, it was confirmed that forming $PS_3O^{3-}$ (monosubstituted body) as the oxygen substitution body of $PS_4^{3-}$ but forming neither $PS_2O_2^{3-}$ (disubstituted body) nor $PSO_3^{3-}$ (trisubstituted body) were important to improve the heat stability of the sulfide solid electrolyte material.

Examples 5-1 to 5-5

A sulfide solid electrolyte material was synthesized by using $Li_3PO_4$. In specific, the sulfide solid electrolyte material was obtained in the same manner as in Example 1 except that the composition of the sulfide solid electrolyte material was changed to "x"=0075 (oxygen substitution amount: 7.5 mol %) in 10LiI.15LiBr.75($Li_3P(S_{(1-x)}O_x)_4$) and the heat treating temperature was changed to 190° C. (Example 5-1). Also, the sulfide solid electrolyte material was obtained in the same manner as in Example 5-1 except for changing "x"=0.1, 0.125, 0.15, and 0.2 (Examples 5-2 to 5-5).

Examples 6-1 to 6-5

A sulfide solid electrolyte material was obtained in the same manner as in Examples 5-1 to 5-5 except that the heat treating temperature was changed to 200° C.

Examples 7-1 to 7-5

A sulfide solid electrolyte material was obtained in the same manner as in Examples 5-1 to 5-5 except that the heat treating temperature was changed to 210° C.

Examples 8-1 to 8-3

A sulfide solid electrolyte material was synthesized without using LiI and LiBr. In specific, the sulfide solid electrolyte material was obtained in the same manner as in Example 5-1 except that the composition of the sulfide solid electrolyte material was changed to "x"=0.075, 0.1, and 0.2 in $Li_3P(S_{(1-x)}O_x)_4$.

Examples 9-1 to 9-3

A sulfide solid electrolyte material was obtained in the same manner as in Examples 8-1 to 8-3 except that the heat treating temperature was changed to 200° C.

Examples 10-1 to 10-3

A sulfide solid electrolyte material was obtained in the same manner as in Examples 8-1 to 8-3 except that the heat treating temperature was changed to 210° C.

Comparative Examples 6-1 to 6-3

A sulfide solid electrolyte material was synthesized by using $P_2O_5$ instead of $Li_3PO_4$. In specific, the sulfide solid electrolyte material was obtained in the same manner as in Comparative Example 2 except that the composition of the sulfide solid electrolyte material was changed to "x"=0.05 (oxygen substitution amount: 5 mol %) in 10LiI.15LiBr.75 $(Li_3P(S_{(1-x)}O_x)_4)$ and the heat treating temperature was changed to 190° C. (Comparative Example 6-1). Also, the sulfide solid electrolyte material was obtained in the same manner as in Comparative Example 6-1 except for changing "x"=0.075 and 0.1 (Comparative Examples 6-2 and 6-3).

Comparative Examples 7-1 to 7-6

A sulfide solid electrolyte material was obtained in the same manner as in Comparative Example 6-1 except for changing the heat treating temperature to be 200° C. and changing "x"=0, 0.025, 0.05, 0.075, 0.1, and 0.25.

Comparative Examples 8-1 to 8-3

A sulfide solid electrolyte material was obtained in the same manner as in Comparative Example 6-1 except for changing the heat treating temperature to be 210° C. and changing "x"=0.05, 0.075, and 0.1.

[Evaluation]
(Li Ion Conductivity Measurement)

A Li ion conductivity measurement was conducted for the sulfide solid electrolyte material obtained in Examples 5-1 to 5-5, Examples 6-1 to 6-5, Examples 7-1 to 7-5, Examples 8-1 to 8-3, Examples 9-1 to 9-3, Examples 10-1 to 10-3, Comparative Examples 6-1 to 6-3, Comparative Examples 7-1 to 7-6, and Comparative Examples 8-1 to 8-3. The obtained powder of the sulfide solid electrolyte material was uni-axial-pressed and formed to apply a restraining pressure of 6 N. The impedance was measured by an electrochemical measurement device manufactured by Solartron. Here, the component value in the real number at $10^5$ Hz was used as the resistance value.

Figure 8:
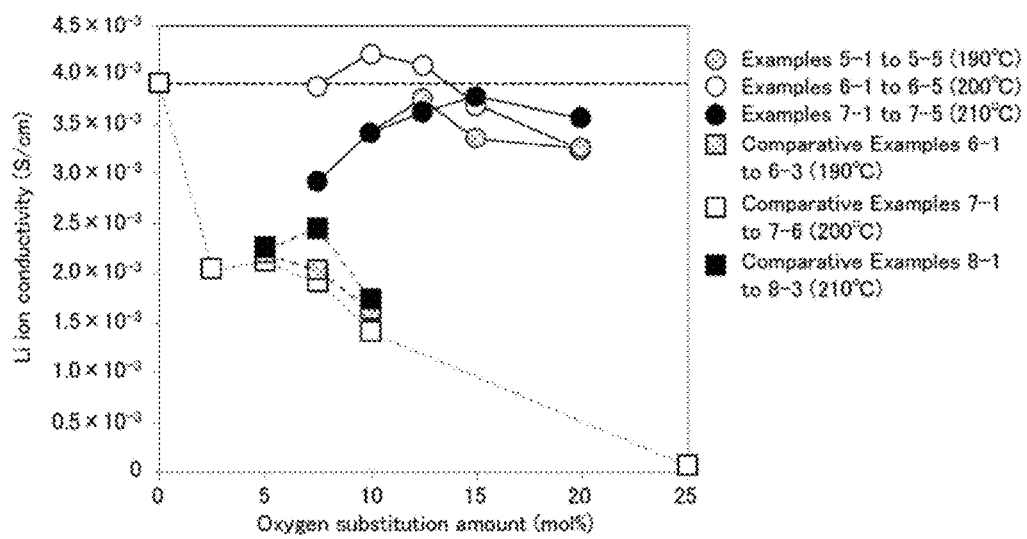
FIG. 8 is the result of the Li ion conductivity measurement for the sulfide solid electrolyte material obtained in Examples 5-1 to 5-5, 6-1 to 6-5, 7-1 to 7-5, Comparative Examples 6-1 to 6-3, 7-1 to 7-6, and 8-1 to 8-3.

As shown in FIG. 8, the Li ion conductivity in Examples 5-1 to 5-5, Examples 6-1 to 6-5, and Examples 7-1 to 7-5 (series using $Li_3PO_4$ as the oxygen source) tended not to decrease, compared with Comparative Examples 6-1 to 6-3, Comparative Examples 7-1 to 7-6, and Comparative Examples 8-1 to 8-3 (series using $P_2O_5$ as the oxygen source). Also, in general, it is more advantageous for the Li ion conduction when the polarizability of a material having an anion structure is larger. Substituting a S element with an O element is disadvantageous for the Li ion conduction since the polarizability of the anion structure decreases. However, in the cases of Example 6-1 (oxygen substitution amount: 7.5 mol %), Example 6-2 (oxygen substitution amount: 10 mol %), and Example 6-3 (oxygen substitution amount: 12.5 mol %), surprisingly, the same or more Li ion conduction as in Comparative Example 7-1 (oxygen substitution amount: 0 mol %) was obtained.

Also, in Examples 5-1 to 5-5 of which the heat treating temperature was 190° C., and in Examples 7-1 to 7-5 of which the heat treating temperature was 210° C., although high Li ion conductivity was not obtained, it is considered that the same or more Li ion conductivity as in Comparative Example 7-1 may be obtained by appropriately setting the heat treating time, even if the heat treating temperature is in the range of 190 to 210° C.

Figure 9:
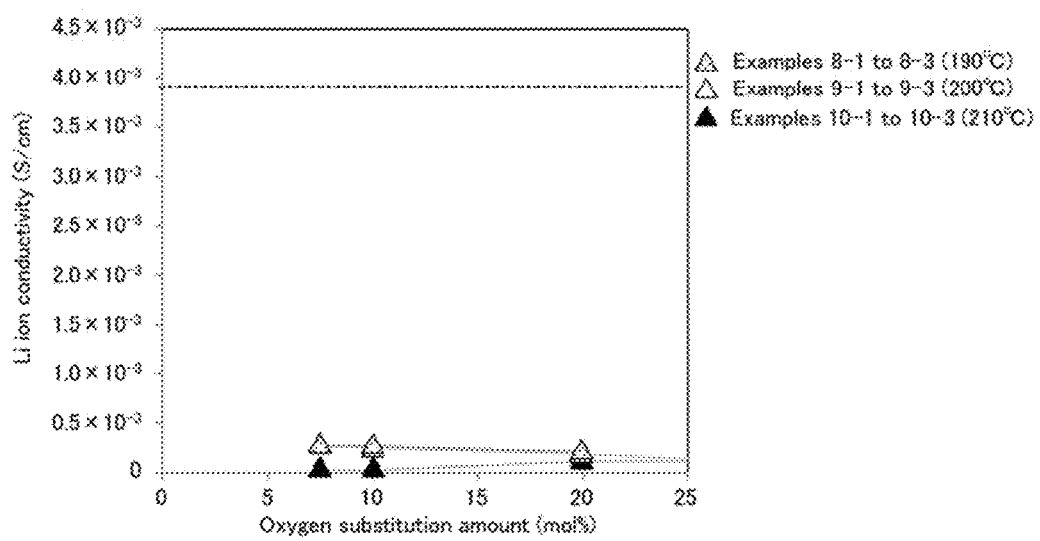
FIG. 9 is the result of the Li ion conductivity measurement for the sulfide solid electrolyte material obtained in Examples 8-1 to 8-3, 9-1 to 9-3, and 10-1 to 10-3.

Incidentally, as shown in FIG. 9, high Li ion conductivity was not obtained in Examples 8-1 to 8-3, Examples 9-1 to 9-3, and Examples 10-1 to 10-3 (series not using lithium halide). From the result, it was suggested that the presence of lithium halide was important in achieving the high Li ion conductivity.

(XRD Measurement)

X-ray diffraction (XRD) measurement using a CuKα ray was conducted for the sulfide solid electrolyte material obtained in Examples 5-1 to 5-5, Examples 6-1 to 6-5, Examples 7-1 to 7-5, Examples 8-1 to 8-3, Examples 9-1 to 9-3, Examples 10-1 to 10-3, Comparative Examples 6-1 to 6-3, Comparative Examples 7-1 to 7-6, and Comparative Examples 8-1 to 8-3. The representative result is shown in FIGS. 10A to 10C.

Figure 10A:
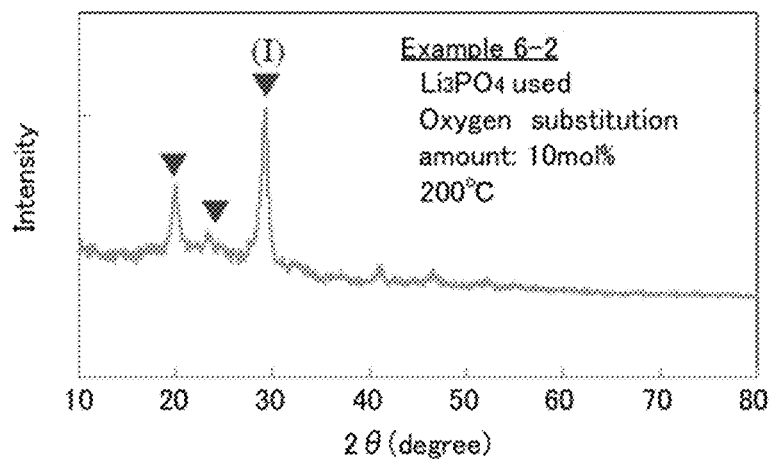
FIGS. 10A to 10C are the result of the XRD measurement for the sulfide solid electrolyte material obtained in Example 6-2, Comparative Example 7-4, and Example 9-2.
Figure 10B:
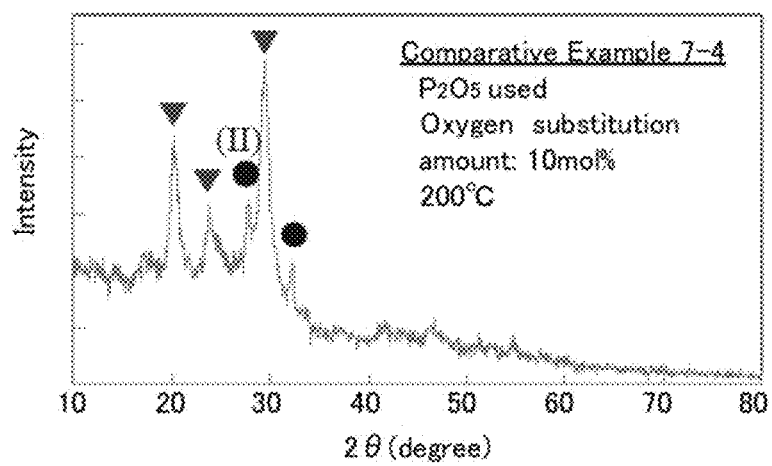
Figure 10C:
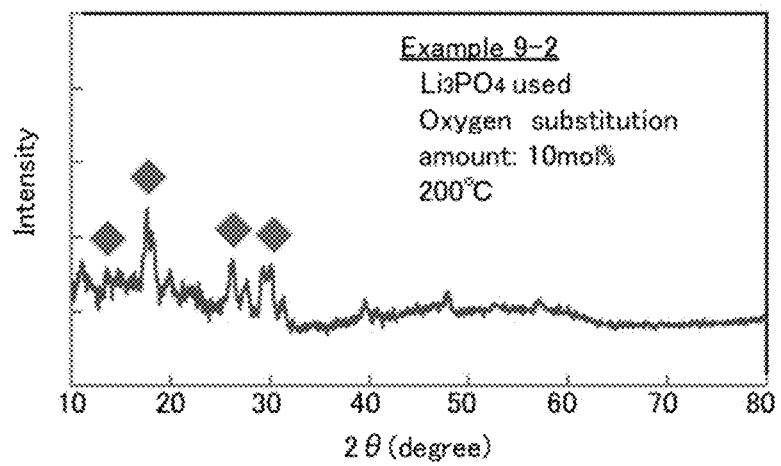

As shown in FIG. 10A, in Example 6-2 which showed the highest Li ion conductivity, the characteristic peak was observed in the vicinity of each 2θ=20.1°, 23.5°, and 29.2°. These peaks are the peaks of the crystal phase A with high Li ion conductivity. Also, as shown in FIG. 10B, in Comparative Example 7-4, the characteristic peak was observed in the vicinity of each 2θ=27.8° and 32.1° in addition to the crystal phase with high Li ion conductivity. These peaks are the peaks of the crystal phase B with low Li ion conductivity.

Also, when the peak intensity in the vicinity of 2θ=29.2° in the crystal phase with high Li ion conductivity was regarded as $I_A$ and the peak intensity in the vicinity of 2θ=27.8° in the crystal phase with low Li ion conductivity was regarded as $I_B$, the value of $I_B/I_A$ (the value after correcting the base line) was 0 in all Example 6-1 (oxygen substitution amount: 7.5 mol %), Example 6-2 (oxygen substitution amount: 10 mol %), and Example 6-3 (oxygen substitution amount: 12.5 mol %). On the other hand, the value of $I_B/I_A$ (the value after correcting the base line) was 0.27 in Comparative Example 7-4 (oxygen substitution amount: 10 mol %).

The reason for the improvement in Li ion conductivity in Examples 6-1 to 6-3 is not completely clear; however, it is presumed that setting the proportion of $Li_3PO_4$ (oxygen substitution amount) and the heat treating time to be in the specific range caused a stoichiometrical gap between the main raw materials $Li_2S$ and $P_2S_5$ to make the environment that prioritized the production of the crystal phase A with high Li ion conductivity. On the other hand, as in Comparative Example 7-4, when $P_2O_5$ was used as the oxygen source, the crystal phase B with low Li ion conductivity was produced along with the crystal phase A with high Li ion conductivity; thus it was presumed that the Li ion conductivity decreased as the result.

Incidentally, if the proportion of $Li_3PO_4$ (oxygen substitution amount) is too small, the path for a Li ion to easily pass through may possibly not be formed; if the proportion of $Li_3PO_4$ (oxygen substitution amount) is too large, Li ion conductivity may possibly be decreased as the result of the substituted O element being the trap site to a Li ion. Also, if the heat treating temperature is too low, the crystal phase A with high Li ion conductivity may possibly not be produced; if the heat treating temperature is too high, a crystal phase with low Li ion conductivity such as $\gamma$-$Li_3PS_4$ may possibly be produced.

Also, as shown in FIG. 10C, in Example 9-2 (series not using lithium halide), the peak of $\beta$-$Li_3PS_4$ with low Li ion conductivity was obtained. From this result also, it was suggested that the presence of lithium halide is important in achieving the high Li ion conductivity.

REFERENCE SIGNS LIST

1 . . . cathode active material layer
2 . . . anode active material layer
3 . . . solid electrolyte layer
4 . . . cathode current collector
5 . . . anode current collector
6 . . . battery case
10 . . . lithium solid battery

What is claimed is:

1. A sulfide solid electrolyte material comprising an ion conductor having (i) a Li element and (ii) an anion structure containing at least a P element, wherein
a main component of the anion structure is $PS_4^{3-}$, and the ion conductor has the $PS_4^{3-}$ and $PS_3O^{3-}$ as the anion structure, but has neither $PS_2O_2^{3-}$ nor $PSO_3^{3-}$.

2. The sulfide solid electrolyte material according to claim 1, wherein the ion conductor further has $PO_4^{3-}$ as the anion structure.

3. The sulfide solid electrolyte material according to claim 1, wherein a proportion of an O element with respect to a total of a S element and the O element in the ion conductor is 20 mol % or less.

4. The sulfide solid electrolyte material according to claim 1, comprising LiX (X is F, Cl, Br, or I) in addition to the ion conductor.

5. The sulfide solid electrolyte material according to claim 1, comprising LiBr and LiI in addition to the ion conductor, containing a high Li ion conductive crystal phase having a peak at a position of $2\theta=29.2°\pm0.5°$ in an XRD measurement using a CuK$\alpha$ ray, but
not containing a low Li ion conductive crystal phase having a peak at a position of $2\theta=27.8°\pm0.5°$.

6. The sulfide solid electrolyte material according to claim 5, which is obtained by amorphizing and then heat treating a sulfide glass containing LiBr, LiI, $Li_2S$, $P_2S_5$, and $Li_3PO_4$, wherein a proportion of the $Li_3PO_4$ with respect to a total of the $Li_2S$, the $P_2S_5$, and the $Li_3PO_4$ is in a range of 7.5 mol % to 12.5 mol %, and the heat treating is carried out at a temperature higher than 190° C. and lower than 210° C.

7. The sulfide solid electrolyte material according to claim 1, which is obtained by amorphizing and then heat treating a sulfide glass containing $Li_2S$, $P_2S_5$, and $Li_3PO_4$.

8. The sulfide solid electrolyte material according to claim 1, wherein the proportion of $PS_4^{3-}$ and $PS_3O^{3-}$ with respect to the anion structure is 50 mol % or more.

9. The sulfide solid electrolyte material according to claim 1, wherein the proportion of $PS_4^{3-}$ and $PS_3O^{3-}$ with respect to the anion structure is 70 mol % or more.

10. The sulfide solid electrolyte material according to claim 1, wherein the proportion of $PS_4^{3-}$ and $PS_3O^{3-}$ with respect to the anion structure is 90 mol % or more.

11. The sulfide solid electrolyte material according to claim 1, wherein the proportion of LiX with respect to the sulfide solid electrolyte material is 1 mol % or more and 40 mol % or less.

12. The sulfide solid electrolyte material according to claim 1, wherein the proportion of LiX with respect to the sulfide solid electrolyte material is 5 mol % or more and 35 mol % or less.

13. The sulfide solid electrolyte material according to claim 1, wherein the proportion of LiX with respect to the sulfide solid electrolyte material is 10 mol % or more and 30 mol % or less.

14. A lithium solid battery comprising a cathode active material layer containing a cathode active material, an anode active material layer containing an anode active material, and a solid electrolyte layer formed between the cathode active material layer and the anode active material layer, wherein
the cathode active material is an oxide active material, and
at least either one of the cathode active material layer and the solid electrolyte layer contains the sulfide solid electrolyte material according to claim 1.

15. A producing method for a sulfide solid electrolyte material, the sulfide solid electrolyte material comprising an ion conductor having (i) a Li element and (ii) an anion structure containing at least a P element;
the method comprising an amorphizing step of obtaining a sulfide glass by amorphizing a raw material composition containing $Li_2S$, $P_2S_5$, and $Li_3PO_4$, and
a heat treating step of obtaining the sulfide solid electrolyte material by heat treating the sulfide glass; wherein
a main component of the anion structure is $PS_4^{3-}$, and
the ion conductor has the $PS_4^{3-}$ and $PS_3O^{3-}$ as the anion structure, but has neither $PS_2O_2^{3-}$ nor $PSO_3^{3-}$.

16. The producing method for a sulfide solid electrolyte material according to claim 15, wherein
the raw material composition further contains LiBr and LiI,
a proportion of the $Li_3PO_4$ with respect to a total of the $Li_2S$, the $P_2S_5$, and the $Li_3PO_4$ is in a range of 7.5 mol % to 12.5 mol %,
a heat treating temperature in the heat treating step is higher than 190° C. and lower than 210° C., and
the sulfide solid electrolyte material has a higher Li ion conductivity than that of a standard sulfide solid electrolyte material without an oxygen substitution.

17. The producing method for a sulfide solid electrolyte material according to claim 15, wherein
the raw material composition further contains LiBr and LiI,
a proportion of the $Li_3PO_4$ with respect to a total of the $Li_2S$, the $P_2S_5$, and the $Li_3PO_4$ is in a range of 7.5 mol % to 12.5 mol %, and
a heat treating temperature in the heat treating step is 200° C.

* * * * *